(12) United States Patent
Alswaidan et al.

(10) Patent No.: US 12,394,061 B2
(45) Date of Patent: Aug. 19, 2025

(54) OBJECT-AWARE ADAPTIVE IMAGE RETARGETING METHOD

(71) Applicant: KING FAHD UNIVERSITY OF PETROLEUM AND MINERALS, Dhahran (SA)

(72) Inventors: Ziyad Adel Alswaidan, Dhahran (SA); Khalil Hedi Chikhaoui, Dhahran (SA); Mohammad Hashem M. Kenana Shullar, Dhahran (SA); Motaz Alfarraj, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 389 days.

(21) Appl. No.: 18/194,164

(22) Filed: Mar. 31, 2023

(65) Prior Publication Data

US 2024/0331164 A1 Oct. 3, 2024

(51) Int. Cl.
*G06T 7/12* (2017.01)
*G06T 3/18* (2024.01)
(Continued)

(52) U.S. Cl.
CPC ............. *G06T 7/12* (2017.01); *G06T 3/18* (2024.01); *G06T 7/11* (2017.01); *G06V 10/462* (2022.01);
(Continued)

(58) Field of Classification Search
CPC . G06T 2207/20084; G06T 2207/20132; G06T 3/04; G06T 3/18; G06T 7/11;
(Continued)

(56) References Cited

U.S. PATENT DOCUMENTS 9,443,283 B2 * 9/2016 Sohn .................... G06T 3/04
9,743,062 B2 * 8/2017 Chamaret ............. G06T 3/04
(Continued)

OTHER PUBLICATIONS

Yan, B., Niu, X., Bare, B. and Tan, W., 2019. Semantic segmentation guided pixel fusion for image retargeting. IEEE Transactions on Multimedia, 22(3), pp. 676-687. (Year: 2019).*

(Continued)

*Primary Examiner* — Chineyere Wills-Burns
*Assistant Examiner* — Emmanuel Silva-Avina
(74) *Attorney, Agent, or Firm* — Oblon, McClelland, Maier & Neustadt, L.L.P.

(57) ABSTRACT

A method of image retargeting including segmenting an input image into a plurality of cells and detecting elements in the input image by a deep learning-based semantic segmentation network. The method includes generating a segmentation map according to a first function, generating a saliency map according to a second function and generating a variance map according to a third function. The method includes constructing an importance map according to a fourth function. The importance map is based on the segmentation map, the saliency map, and the variance map. The method includes inputting the importance map into a distortion threshold function. The distortion threshold function calculates a distortion threshold. The method includes calculating a distortion measure and determining a modification to be applied to each of the plurality of cells. The method includes applying the modification to each of the plurality of cells and outputting a retargeted image.

20 Claims, 13 Drawing Sheets

(51) Int. Cl.
*G06T 7/11* (2017.01)
*G06V 10/46* (2022.01)

(52) U.S. Cl.
CPC ............... *G06T 2207/20084* (2013.01); *G06T 2207/20132* (2013.01); *G06V 2201/07* (2022.01)

(58) Field of Classification Search
CPC ......... G06T 7/12; G06T 7/136; G06V 10/462; G06V 10/82; G06V 2201/07
USPC ........................................................ 382/173
See application file for complete search history.

(56) References Cited

U.S. PATENT DOCUMENTS

| | | | |
|---|---|---|---|
| 2007/0025637 | A1 | 2/2007 | Setlur et al. |
| 2012/0121204 | A1 | 5/2012 | Ding et al. |
| 2021/0409725 | A1 | 12/2021 | Pedzisz |
| 2022/0383448 | A1* | 12/2022 | Valdez Balderas ....... G06T 3/04 |

OTHER PUBLICATIONS

Ahmadi, M., Karimi, N. and Samavi, S., 2021. Context-aware saliency detection for image retargeting using convolutional neural networks. Multimedia Tools and Applications, 80(8), pp. 11917-11941. (Year: 2021).*

Setlur, V., Takagi, S., Raskar, R., Gleicher, M. and Gooch, B., Dec. 2005, Automatic image retargeting. In Proceedings of the 4th international conference on Mobile and ubiquitous multimedia (pp. 59-68). (Year: 2005).*

Alswaidan et al. 2022. Object-Aware Adaptive Retargeting Via Importance Map Fusion. Elsevier. Pattern Recognition Letters. 7 Pages (Year: 2022).*

Le, T.N.H., Lin, S.S., Dong, W. and Lee, T.Y., 2021. Content-aware media retargeting based on deep importance map. arXiv preprint arXiv:2111.04396. (Year: 2021).*

Alswaidan et al. ; Object-Aware Adaptive Image Retargeting Via Importance Map Fusion ; Elsevier ; Pattern Recognition Letters ; 2022 ; 7 Pages.

Le et al. ; Content-aware media retargeting based on deep importance map ; Chinese Academy of Science and School of Artificial Intelligence ; Nov. 8, 2021 ; 12 Pages.

Hsu et al. ; Objective Quality Assessment for Image Retargeting Based on Perceptual Geometric Distortion and Information Loss ; IEEE Journal of Selected Topics in Signal Processing, vol. 8, Issue 3 ; Mar. 14, 2014 ; Abstract Only ; 3 Pages.

* cited by examiner

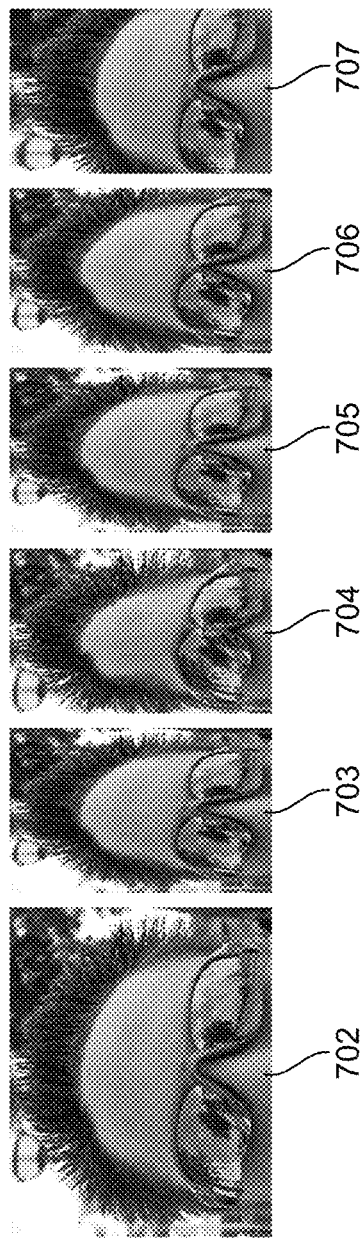
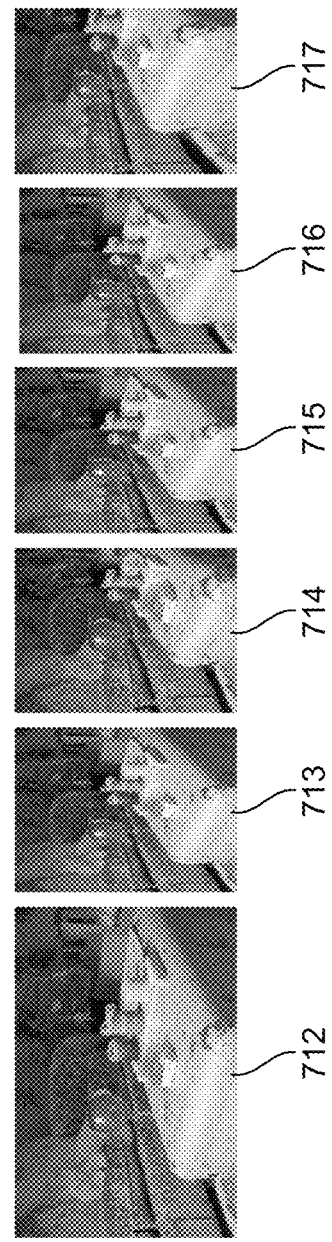
FIG. 7A
FIG. 7B

OBJECT-AWARE ADAPTIVE IMAGE RETARGETING METHOD

STATEMENT REGARDING PRIOR DISCLOSURES BY THE INVENTORS

Aspects of this technology are described in Alswaidan, Ziyad, et al. "Object-Aware Adaptive Image Retargeting Via Importance Map Fusion." Github, github.com/K-IPRG/Adaptive-Image-Retargeting, which are incorporated by reference in its entirety.

STATEMENT OF ACKNOWLEDGEMENT

The support provided by the Department of Electrical Engineering and the SDAIA-KFUMP Joint Research Center for Artificial Intelligence at King Fahd University of Petroleum and Minerals (KFUMP), Dhahran, Saudi Arabia, is gratefully acknowledged.

BACKGROUND OF THE INVENTION

Technical Field

The present disclosure is directed to an object-aware adaptive image retargeting method that employs importance map fusion.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As the screen sizes of computing devices diversify, there is a compatibility issue with sharing and displaying multimedia among different users. The multimedia needs to be displayed at different resolutions, and equipment width-to-height ratios continue to increase. Specifically, many computer vision pipelines require input to be a specific size. A simple resizing of an image might negatively impact its content and, in turn, degrade the output of the computer vision pipeline. Image retargeting is defined as a process of adapting an original picture for display at different resolutions and equipment width-to-height ratios.

Conventional image retargeting techniques can be broadly categorized into three categories; discrete, continuous, and multi-operator methods. Discrete methods achieve the desired size by inserting or removing pixels from the image. For example, seam carving iteratively generates top-down and left-right lines, based on an image energy function, along which the aspect ratio of the image will be changed. Due to the repetitive removal of pixels, discrete methods frequently exhibit discontinuity artifacts. Continuous retargeting methods map images to target images with desired dimensions by applying non-uniform sampling or scaling. Continuous retargeting methods often result in smoother images compared to their discrete counterparts since they apply region resizing and interpolation. However, the continuous retargeting methods suffer from artifacts such as distorting geometric shapes. Multi-operator methods combine different techniques, such as seam carving and scaling, to achieve a more general retargeting. In the multi-operator methods, a multidimensional resizing space is defined that contains several retargeting methods. Multi-operator methods find an optimal path representing a series of operations to achieve the target size for the image.

Most image retargeting methods employ importance maps to identify important objects in the image. The importance map is prone to capture an important part of the image several times, resulting in distorted and visually unappealing images. The importance maps used in different techniques are often generated using saliency detection, or semantic segmentation, putting an unnecessary constraint on the retargeting technique.

Some image retargeting methods have utilized deep neural networks (DNNs) and reinforcement learning (RL) to find an optimal operator for the retargeted image. Although DNNs do not require an importance map, their use for image retargeting was not as extensive as in other problems (e.g., segmentation), due to the nature of the retargeting problem and the difficulty of building a large dataset for training.

An existing content-aware image resizing technique for both reduction and expansion was described, which employs an image operator called seam carving. (See: S. Avidan, A. Shamir, "Seam carving for content-aware image resizing", ACM SIGGRAPH 2007 Papers, SIGGRAPH '07, Association for Computing Machinery, New York, NY, USA, 2007. Another existing retargeting technique was described in which multiple retargeting operators were combined and retargeted images were generated at each stage to determine the optimal sequence of operators. (See: N. Kajiura, S. Kosugi, X. Wang, T. Yamasaki., "Self-play reinforcement learning for fast image retargeting," proceedings of the $28^{th}$ ACM International Conference on Multimedia (October 2020). A conventional deep cyclic image retargeting technique that uses reverse mapping from the retargeted images to the given input images was described. (See: W. Tan, B. Yan, C. Lin, X. Niu., "Cycle-IR: Deep cyclic image retargeting," IEEE Transactions on Multimedia 22 (7) (2020) 1730-1743). However, the techniques described in these references and other conventional techniques have several limitations, including giving equal importance to different objects and degrading the retargeting process performance because some objects are more sensitive to distortions than others.

Hence, there is a need for an image retargeting system that considers the importance level of the various objects in the image in addition to the overall structure to achieve a better target aspect ratio.

SUMMARY

In an exemplary embodiment, a method of image retargeting is disclosed. The method includes segmenting, via processing circuitry, an input image into a plurality of cells. The method includes detecting, via the processing circuitry, elements in the input image by a segmentation network. The method includes generating, via the processing circuitry, a segmentation map according to a first function $\Psi_{seg}$ based on the input image, wherein the segmentation map includes the elements in the input image detected by the deep learning-based semantic segmentation network. The method includes generating, via the processing circuitry, a saliency map according to a second function $\Psi_{sal}$ based on the input image, wherein the second function contains a hyperparameter $\lambda$, the hyperparameter $\lambda$ being assigned a weight, the second function being multiplied by the hyperparameter $\lambda$. The method includes generating, via the processing circuitry, a variance map according to a third function $\Psi_{var}$ based on the input image, wherein the third function contains a hyperparameter α, the hyperparameter α being assigned a weight, the third function being multiplied by the hyperparameter α. The method includes constructing, via the processing circuitry, an importance map according to a fourth function $\Psi_{imp}$, wherein the importance map is based on the segmentation map, the saliency map, and the variance map. The method includes inputting the importance map into a distortion threshold function, wherein the distortion threshold function calculates a distortion threshold ($D_t$). The method includes calculating a distortion measure ($D_m$) for each of the plurality of cells, according to the input image. The method includes determining, according to $D_t$ and $D_m$, a modification to be applied to each of the plurality of cells. The method includes applying the modification to each of the plurality of cells, wherein the modification generates a modified plurality of cells, the modified plurality of cells comprising a retargeted image. The method includes outputting the retargeted image, wherein at least one dimension of the retargeted image is different than a corresponding dimension of the input image.

In another exemplary embodiment, a non-transitory computer readable medium having stored thereon a program that when executed by the computer causes the computer to implement a method for image retargeting is disclosed. The method includes segmenting, via processing circuitry, an input image into a plurality of cells. The method includes detecting, via the processing circuitry, elements in the input image by a segmentation network. The method includes generating, via the processing circuitry, a segmentation map according to a first function $\Psi_{seg}$ based on the input image, wherein the segmentation map includes the elements in the input image detected by the deep learning-based semantic segmentation network. The method includes generating, via the processing circuitry, a saliency map according to a second function $\Psi_{sal}$ based on the input image, wherein the second function contains a hyperparameter λ, the hyperparameter λ being assigned a weight, the second function being multiplied by the hyperparameter λ. The method includes generating, via the processing circuitry, a variance map according to a third function $\Psi_{var}$ based on the input image, wherein the third function contains a hyperparameter α, the hyperparameter α being assigned a weight, the third function being multiplied by the hyperparameter α. The method includes constructing, via the processing circuitry, an importance map according to a fourth function $\Psi_{imp}$, wherein the importance map is based on the segmentation map, the saliency map, and the variance map. The method includes inputting the importance map into a distortion threshold function, wherein the distortion threshold function calculates a distortion threshold ($D_t$). The method includes calculating a distortion measure ($D_m$) for each of the plurality of cells, according to the input image. The method includes determining, according to $D_t$ and $D_m$, a modification to be applied to each of the plurality of cells. The method includes applying the modification to each of the plurality of cells, wherein the modification generates a modified plurality of cells, the modified plurality of cells comprising a retargeted image. The method includes outputting the retargeted image, wherein at least one dimension of the retargeted image is different than a corresponding dimension of the input image.

In another exemplary embodiment, an image retargeting system is disclosed. The system includes a computing device comprising a memory and processing circuitry. The memory stores an input image. The input image includes at least one subject and at least one class. The processing circuitry executes instructions stored in memory. The execution of the instructions by the processing circuitry implements a method of image retargeting. The method includes segmenting the input image into a plurality of cells. The method includes detecting elements in the input image by a segmentation network. The method includes generating a segmentation map according to a first function $\Psi_{seg}$ based on the input image, wherein the segmentation map includes the elements in the input image detected by the deep learning-based semantic segmentation network. The method includes generating a saliency map according to a second function $\Psi_{sal}$ based on the input image, wherein the second function is assigned a hyperparameter λ, the hyperparameter λ being assigned a weight, the second function being multiplied by the hyperparameter λ. The method includes generating a variance map according to a third function $\Psi_{var}$ based on the input image, wherein the third function is assigned a hyperparameter α, the hyperparameter α being assigned a weight, the third function being multiplied by the hyperparameter α. The method includes constructing an importance map according to a fourth function $\Psi_{imp}$, wherein the importance map is based on the segmentation map, the saliency map, and the variance map. The method includes inputting the importance map into a distortion threshold function, wherein the distortion threshold function calculates a distortion threshold ($D_t$). The method includes calculating a distortion measure ($D_m$), according to the input image. The method includes determining, according to $D_t$ and $D_m$, a modification of each of the plurality of cells. The method includes outputting a retargeted image, wherein the dimension of the retargeted image is different than the input image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A is a representation of a source image and corresponding retargeted images obtained using different retargeting techniques, according to aspects of the present disclosure;

FIG. 7B is another representation of a source image and corresponding retargeted images obtained using different retargeting techniques, according to aspects of the present disclosure;

DETAILED DESCRIPTION

Figure 1C:
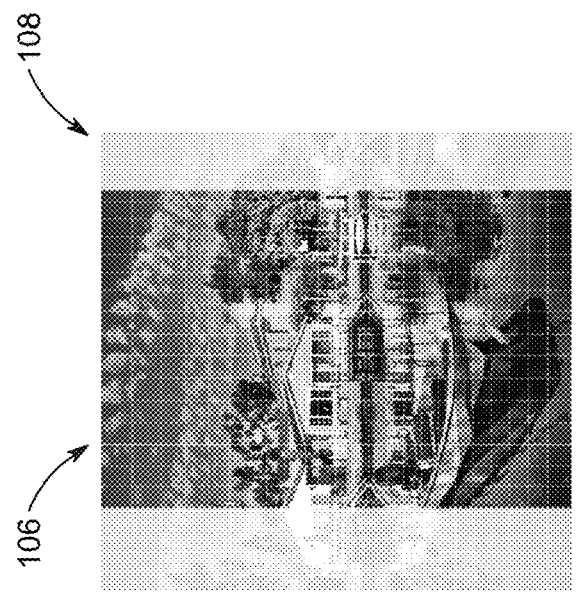
FIG. 1C illustrates an output image obtained from a hybrid AAD image retargeting technique.

In the drawings, like reference numerals designate identical or corresponding parts throughout the several views. Furthermore, the terms "approximately," "approximate," "about," and similar terms generally refer to ranges that include the identified value within a margin of 20%, 10%, or preferably 5%, and any values therebetween.

Multiple image retargeting techniques use saliency maps to identify parts of the image that are defined with higher consideration over other parts (for example, the aspects that provide rich information on the image such as edges and interest points, also known as important features). The saliency maps give equal importance to different objects without acknowledging what the objects are, resulting in a degradation of the performance of the retargeting process.

Aspects of this disclosure are directed to an image retargeting system and a method of image retargeting. The disclosed method is a content-aware and adaptive image retargeting method that generates a non-binary importance map corresponding to an input image. In addition, the method utilizes the generated non-binary importance map to achieve an enhanced target aspect ratio. The disclosed method is an adaptive image retargeting method that uses an object-aware importance map. In an aspect, the adaptive image retargeting method considers a level of importance for the different objects in the image.

In various aspects of the disclosure, non-limiting definitions of one or more terms that will be used in the document are provided below.

The term "image retargeting" as used herein refers to a process of changing an aspect ratio of an image while minimizing the distortions in the content.

The term "saliency map" as used herein refers to an image that highlights a region on the image on which people's eyes focus first. The saliency map reflects a degree of importance of a pixel to a human visual system.

The term "importance map" as used herein indicates a degree of conspicuousness in the image for each pixel. The importance map indicates the importance of each pixel included in the previous frame image. Accordingly, when a user views an image, a region primarily viewed, or a region of interest may have a large pixel value in the importance map. In an aspect, an image processing device may determine a scale factor (or scale weight) based on the importance map. For example, the image processing device may generate the importance map using a neural network, but is not limited thereto.

Figure 1B:
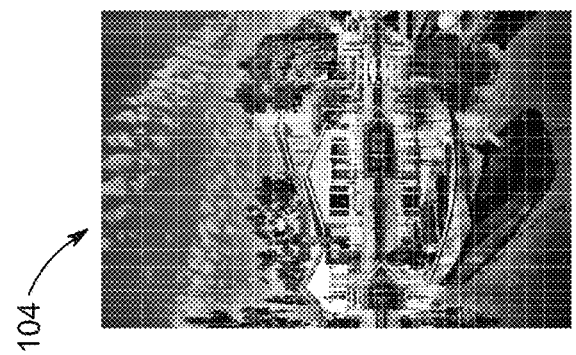
FIG. 1B illustrates an output image obtained from an axis-aligned deformation (AAD) image retargeting technique.
Figure 1A:
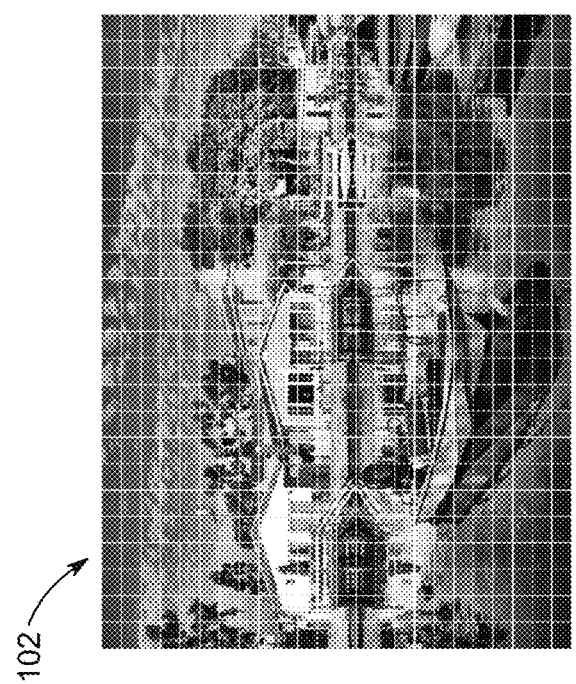
FIG. 1A illustrates a source image used in an image retargeting technique.

FIGS. 1A-1C illustrate a conventional technique for image retargeting. In an example, the conventional technique for image retargeting is an axis-aligned deformation (AAD) technique and a hybrid AAD technique.

FIG. 1A illustrates a source image 102 used as an input image in the image retargeting technique.

FIG. 1B illustrates an image 104 received as an output image obtained from the AAD image retargeting technique.

FIG. 1C illustrates an image 106 received as an output image obtained from the hybrid AAD image retargeting technique. A portion (108) of the input image 102 was cropped during the image retargeting.

Referring to FIG. 1A-FIG. 1C, the AAD is a technique for the image retargeting that employs an image and its correspondence importance map.

The AAD divides the input image 102 into a grid of cells and then warps each cell to achieve the desired dimensions for the input image, as shown in FIG. 1B. The new dimensions for each cell are achieved by solving a quadratic problem (QP). The QP considers the importance of each cell obtained from the importance map, which allows for different warping for different parts of the image. The AAD assumes that a good importance map is provided with the input image. In some examples, hand-drawn importance maps are used to ensure the quality of the retargeted images. The AAD operates locally on each cell, but AAD does not apply global image resizing or cropping when needed, thereby limiting the scope of the AAD in the image retargeting.

In the hybrid AAD, a hybrid compromise between AAD and cropping is introduced, in which the cropping is based on a distortion measure. The distortion measure is configured to decide when to stop the cell warping. Further, the distortion measure is configured to decide when to crop the rest of the pixels (cells) to achieve the desired dimensions, as shown in FIG. 1C. The distortion measure $D_m$ may be defined as:

$$D_m = \frac{1}{A}\sum_{i=1}^{N}\left[\frac{\max(x'_i, y'_i)}{\min(x'_i, y'_i)} - 1\right] \cdot x_i \cdot y_i \cdot (\Omega_i + \Omega_0). \quad (1)$$

where A is the area of the warped image, N is the number of cells, $x_i$ and $y_i$ are the height and the width of the $i^{th}$ cell, $x_i'$ and $y_i'$ are its normalized height and width. $\Omega_i$ is the average importance of the pixels in the $i^{th}$ cell. $\Omega_0$ is a hyperparameter used to evenly add some distortion even to all cells. The $\Omega_0$ is normalized such that $\Omega_0 \in [0, 1]$.

When the distortion measure exceeds a distortion threshold $D_t$, the hybrid AAP employs a 1-D importance map for cropping the remaining pixels to achieve the desired size. The 1-D importance map is an average importance value for either all rows or all columns, depending on the direction of cropping. One limitation of the hybrid AAD is that in the hybrid AAD, hyperparameters are usually manually set by the user based on the image content. Thus, the results are sensitive to the choice of hyperparameters, thereby limiting the use of the hybrid AAP to the most visible cases where features that provide rich information of the image are on opposite edges.

Figure 2:
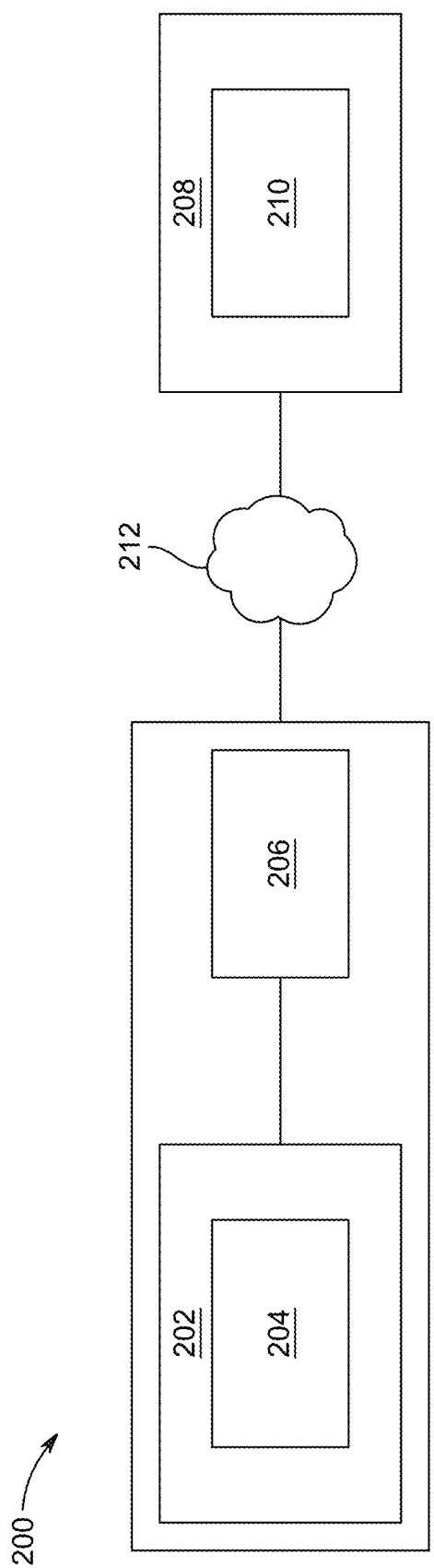
FIG. 2 illustrates a block diagram of an image retargeting system, according to aspects of the present disclosure.

FIG. 2 illustrates a block diagram of an image retargeting system 200 (hereinafter interchangeably referred to as "the system 200"), according to aspects of the present disclosure. In an aspect, the image retargeting system 200 is connected to an image capture device 208 over a network 212. Although the image retargeting system 200 and image capture device 208 are shown to be separate elements connected via the network 212 in the figures, in some examples the image retargeting system 200 and image capture device 208 can be implemented as a single unit. In an aspect, the network 212 refers to a whole world network ("internetwork"), a cloud network, an internet, an intranet, a local area network (LAN), a wide area network (WLAN), a wireless communication network, a Wi-Fi network, or a wired network (and combinations thereof) having one or more nodes through which signals are received and processed or retransmitted. The network 212 may be wired or wireless, for example a Zigbee radio network or a BLUETOOTH® low energy radio network of devices that are linked by a handshake protocol. Also included are telephone networks linked to wireless networks, such as AIN (Advance Intelligent Network), MSTO (Mobile Switching Telephone Office, and PSTN (Public Switched Telephone Network).

The image capture device 208 includes a processor 210. The processor 210 is configured with instructions to capture the input image 204. The processor 210 of the image capture device 208 transfers the input image to the image retargeting system over the network 212 using a transceiver unit (not shown). The image retargeting system 200 is configured to store the received input image 204 in the memory 202 of the image retargeting system 200. In an aspect, the input image 204 is processed to obtain an enhanced image as an output image (retargeted image). In an example, the image capture device 208 may be a camera, a desktop computer, a laptop, a tablet computer, a smartphone, a mobile device, an image sensor, a Personal Digital Assistant (PDA), a camera, or any other computing device that has processing capabilities. In an aspect, the image retargeting system 200 is configured to receive an input image 204 such as a photo, an image, a video, or image information. In another example the image capture device 208 may include a camera section, which includes a lens and shutter for capturing photographs of the surroundings around the image capture device 208. The camera section can be a separate feature attached to the image capture device 208 or it can be a built-in camera feature.

The system 200 includes a memory 202, and processing circuitry 206 (also referred to as an image processing system). The memory 202 stores one or more input image (s) 204. In an aspect, the memory 202 stores program instructions. The input image 204 includes at least one subject and at least one class. The processing circuitry 206 is configured to perform the program instructions. According to an aspect of the present disclosure, the processing circuitry 206 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processing circuitry 206 may be configured to fetch and execute computer-readable instructions stored in the memory 202. The memory 202 may be coupled to the processing circuitry 206 and may include any computer-readable medium known in the art including, for example, volatile memory, such as static random-access memory (SRAM) and dynamic random-access memory (DRAM) and/or nonvolatile memory, such as read-only memory (ROM), erasable programmable ROM, flash memories, hard disks, optical disks, and magnetic tapes.

Under the execution of the instructions, the processing circuitry 206 is configured to receive the input image 204 and segments the input image 204 into a plurality of cells. The processing circuitry 206 detects elements in the input image 204 by a semantic segmentation network. The processing circuitry 206 generates a segmentation map according to a first function $\Psi_{seg}$ based on the input image 204. In an example, the segmentation map includes the elements in the input image 204 detected by the semantic segmentation network.

Under the execution of the instructions, the processing circuitry 206 is configured to generate a saliency map according to a second function $\Psi_{sal}$ based on the input image 204. In an example, the second function is assigned with a hyperparameter λ. The hyperparameter λ is assigned with a weight. The second function is multiplied by the hyperparameter λ.

Under the execution of the instructions, the processing circuitry 206 is configured to generate a variance map according to a third function $\Psi_{var}$ based on the input image 204. In an example, the third function is assigned with a hyperparameter α. The hyperparameter α is assigned with a weight. The third function is multiplied by the hyperparameter α. In an aspect, the variance map is computed by the processing circuitry 206 as a blockwise local variant of the input image 204.

The processing circuitry 206 is configured to construct an importance map according to a fourth function $\Psi_{imp}$. In an example, the importance map is based on the segmentation map, the saliency map, and the variance map.

The processing circuitry 206 is configured to input the importance map into a distortion threshold function. The distortion threshold function calculates a distortion threshold ($D_t$). According to the input image 204, the processing circuitry 206 calculates a distortion measure ($D_m$).

According to $D_t$ and $D_m$, the processing circuitry 206 determines a modification of each of the plurality of cells and outputs the retargeted image. The dimensions of the retargeted image are different than the input image 204.

Figure 3:
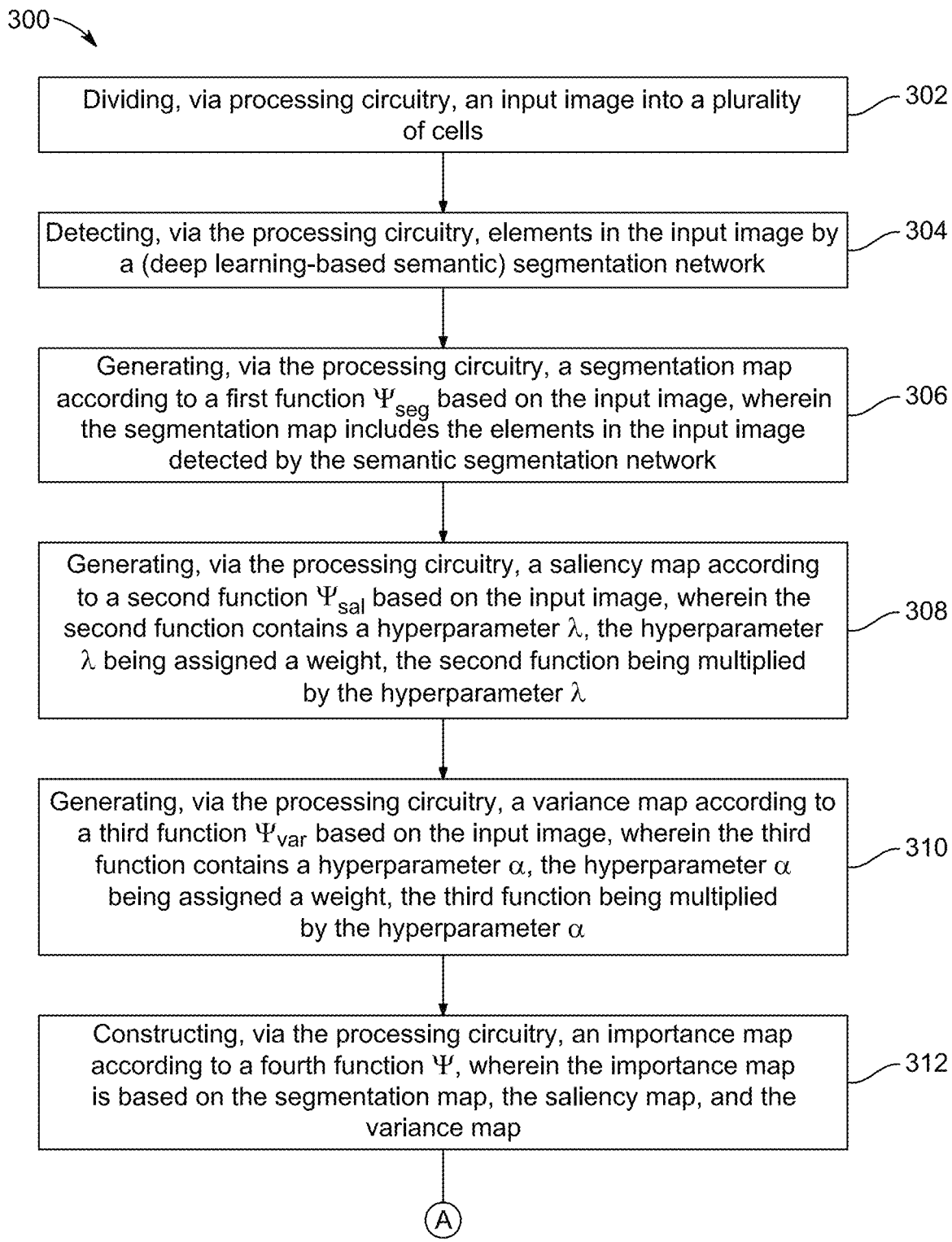
FIG. 3 illustrates an exemplary flow chart of a method of image retargeting, according to aspects of the present disclosure.
Figure 3:
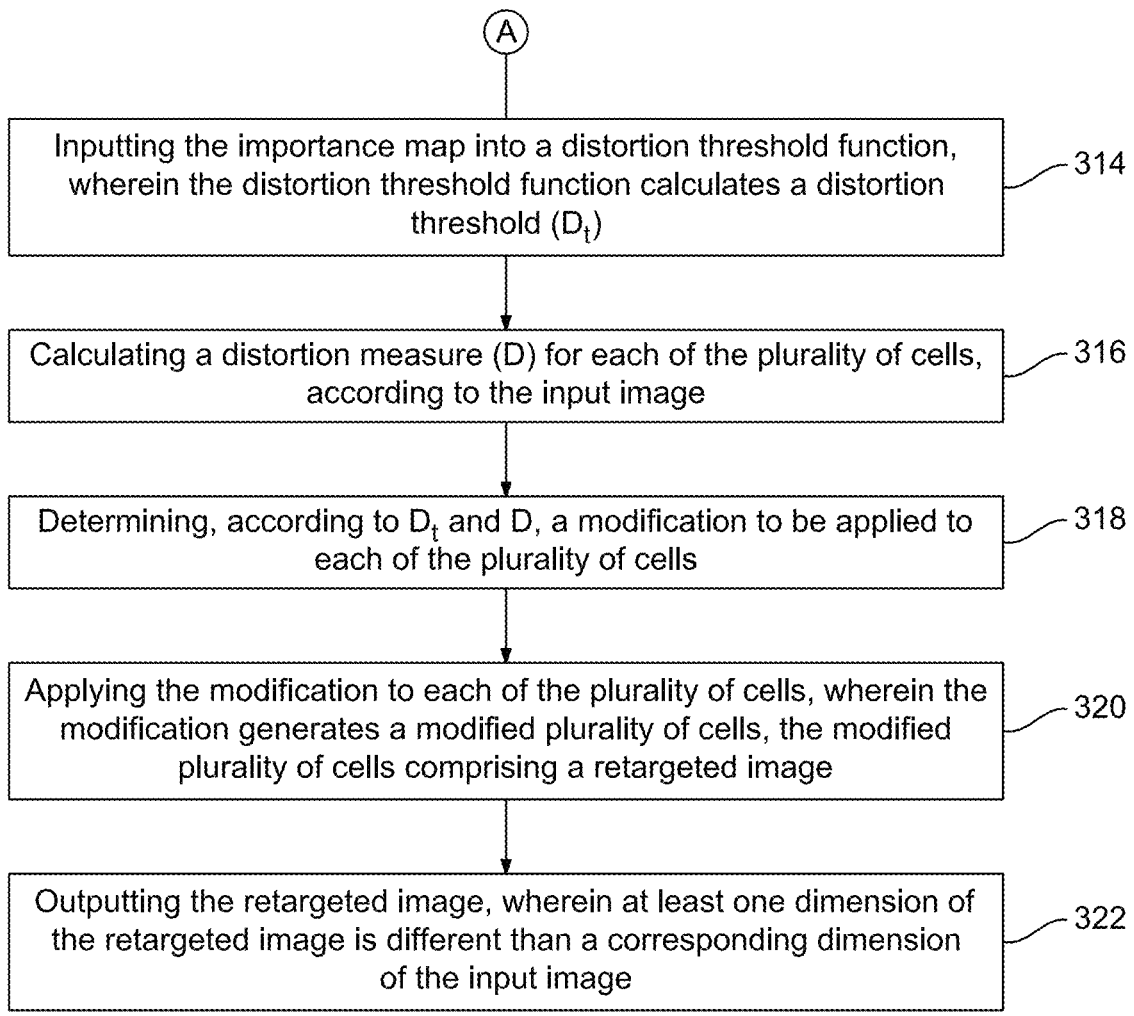

FIG. 3 illustrates a method 300 of image retargeting, according to aspects of the present disclosure.

Step 302 includes segmenting, via a processing circuitry 206, an input image 204 into a plurality of cells. In an aspect, the system 200 receives the input image 204 from the image capture device 208.

Step 304 includes detecting, via the processing circuitry 206, elements in the input image 204 by a semantic segmentation network. In an aspect, the input image 204 is divided into multiple segments. Every pixel in the input image 204 is associated with an object type. For example, there are two major types of image segmentation-deep learning-based semantic segmentation and instance segmentation. In the deep learning-based semantic segmentation, all objects of the same type are marked using one class label, while in the instance segmentation similar objects get their own separate labels.

Further, according to one exemplary embodiment, the architecture of the deep learning-based semantic segmentation network comprises an encoder and a decoder, wherein the encoder extracts the features from the input image 204 using a convolutional neural network (CNN) and the decoder then using these features to produce the segmentation map that assigns a label to each pixel.

In one aspect, the deep learning-based semantic segmentation network utilizes a Fully Convolutional Network (FCN). In this architecture, FCN has an encoder that is typically a pre-trained CNN model, such as VGG, ResNet, or Inception, followed by a decoder that upsamples the feature maps to the input image 204 resolution. The upsampling is typically done using transposed convolutional layers or a bilinear interpolation.

In another aspect, the deep learning-based semantic segmentation network employs the use of the U-Net, which has a similar encoder-decoder structure, but with skip connections between the encoder and decoder. These skip connections allow the decoder to use low-level features from the encoder, which can improve the segmentation accuracy.

Step 306 includes generating, via the processing circuitry 206, the segmentation map according to a first function $\Psi_{seg}$ based on the input image 204. The segmentation map includes the elements in the input image 204 detected by the semantic segmentation network. In an example, the segmentation map is a weighted combination of class maps. Each class map is a combination of outputs of the semantic segmentation network. In an example, each output of the semantic segmentation network is a binary map of detected elements in the input image 204. Further, each class map corresponds to a class of elements. Each class of elements is mutually exclusive.

In an aspect, the step 306 further includes choosing the class of elements. In an example, the class of elements corresponds to at least one detected element in the input image 204. The at least one detected element in the input image 204 corresponds to parts of the input image 204 most noticeable to human perception.

Step 308 includes generating, via the processing circuitry 206, the saliency map according to a second function $\Psi_{sal}$ based on the input image 204. The second function $\Psi_{sal}$ contains a hyperparameter $\lambda$. The hyperparameter $\lambda$ is assigned a weight. The second function $\Psi_{sal}$ is multiplied by the hyperparameter $\lambda$.

Step 310 includes generating, via the processing circuitry 206, the variance map according to a third function $\Psi_{var}$ based on the input image 204. The third function $\Psi_{var}$ contains a hyperparameter $\alpha$. The hyperparameter $\alpha$ is assigned a weight. The third function $\Psi_{var}$ is multiplied by the hyperparameter $\alpha$.

Step 312 includes constructing, via the processing circuitry 206, the importance map according to a fourth function $\Psi_{imp}$. The importance map is based on the segmentation map, the saliency map, and the variance map. In an example, the importance map is non-binary.

In an aspect, the fourth function $\Psi_{imp}$ is:

$$\Psi_{imp} = \Psi_{seg} + \lambda \Psi_{sal-seg} + \alpha \Psi_{var},$$

wherein $\Psi_{sal-seg}$ is a map that contains a class of elements that are present in the saliency map but are not included in the segmentation map, and wherein the hyperparameter $\lambda$ of $\Psi_{sal-seg}$ and the hyperparameter $\alpha$ of $\Psi_{var}$ denotes the assigned weight of the respective function on the fourth function.

Step 314 includes inputting the importance map into a distortion threshold function. In an aspect, the distortion threshold function calculates a distortion threshold ($D_t$). In an example, the distortion threshold ($D_t$) is set adaptively according to:

$$D_t = \frac{1}{\beta} \sum_{i=1}^{\Delta L} \frac{2(L-i)}{L(L-1)} K_i,$$

wherein $\beta$ is an average importance value of the importance map, wherein $\Delta L$ is a difference between a dimension of the image and a target dimension of the retargeted image change in a dimension of the input image, wherein L is the dimension of the input image, wherein K is constructed using a 1-dimensional importance vector, wherein each element of the 1-dimensional importance vector is an average of importance values in a row or a column of the importance map, and wherein K is a vector containing each element of the 1-D importance vector in ascending order.

Step 316 includes calculating a distortion measure ($D_m$) for each of the plurality of cells, according to the input image. In an aspect, the step 316 further includes calculating the distortion measure ($D_m$) for a selected cell of the plurality of cells using equation (1).

Further, the step 316 includes comparing $D_m$ to $D_t$, and warping the selected cell of the plurality of cells if D is less than $D_t$. In an aspect, the warping of each cell of the plurality of cells alters a height of each of the plurality of cells and alters a length of each of the plurality of cells. The warping of each of the plurality of cells being based on the importance map.

In an aspect, the step 316 further includes obtaining an importance of each of the plurality of cells from the importance map. The warping of each of the plurality of cells is achieved by inputting the importance of each of the plurality of cells into a quadratic program. The quadratic program calculates a new height and a new length of each of the plurality of cells.

In an aspect, the step 316 further includes cropping the selected cell of the plurality of cells if $D_m$ is greater than $D_t$.

Step 318 includes determining, according to distortion threshold ($D_t$) and $D_m$ distortion measure ($D_m$), a modification to be applied to each of the plurality of cells.

Step 320 includes applying the modification to each of the plurality of cells. The modification generates a modified plurality of cells. The modified plurality of cells includes a retargeted image.

Step 322 includes outputting the retargeted image. In an aspect, at least one dimension of the retargeted image is different than a corresponding dimension of the input image. In an example, the retargeted image is transmitted to a user computing device to be displayed. For example, the user computing device can include personal digital assistants (PDA) or smartphones, tablet devices, wireless computers, or other electronic devices having the ability to exchange data with the network. Each user computing device can have a display screen, speaker, and/or other input/output (I/O) device for presenting text, graphics, voice, video, recorded messages, and/or other data exchanged. The user computing device can have different configurations, for example, different display sizes, form factors, connection speeds, and/or other physical or electronic distinguishing features.

Figure 4:
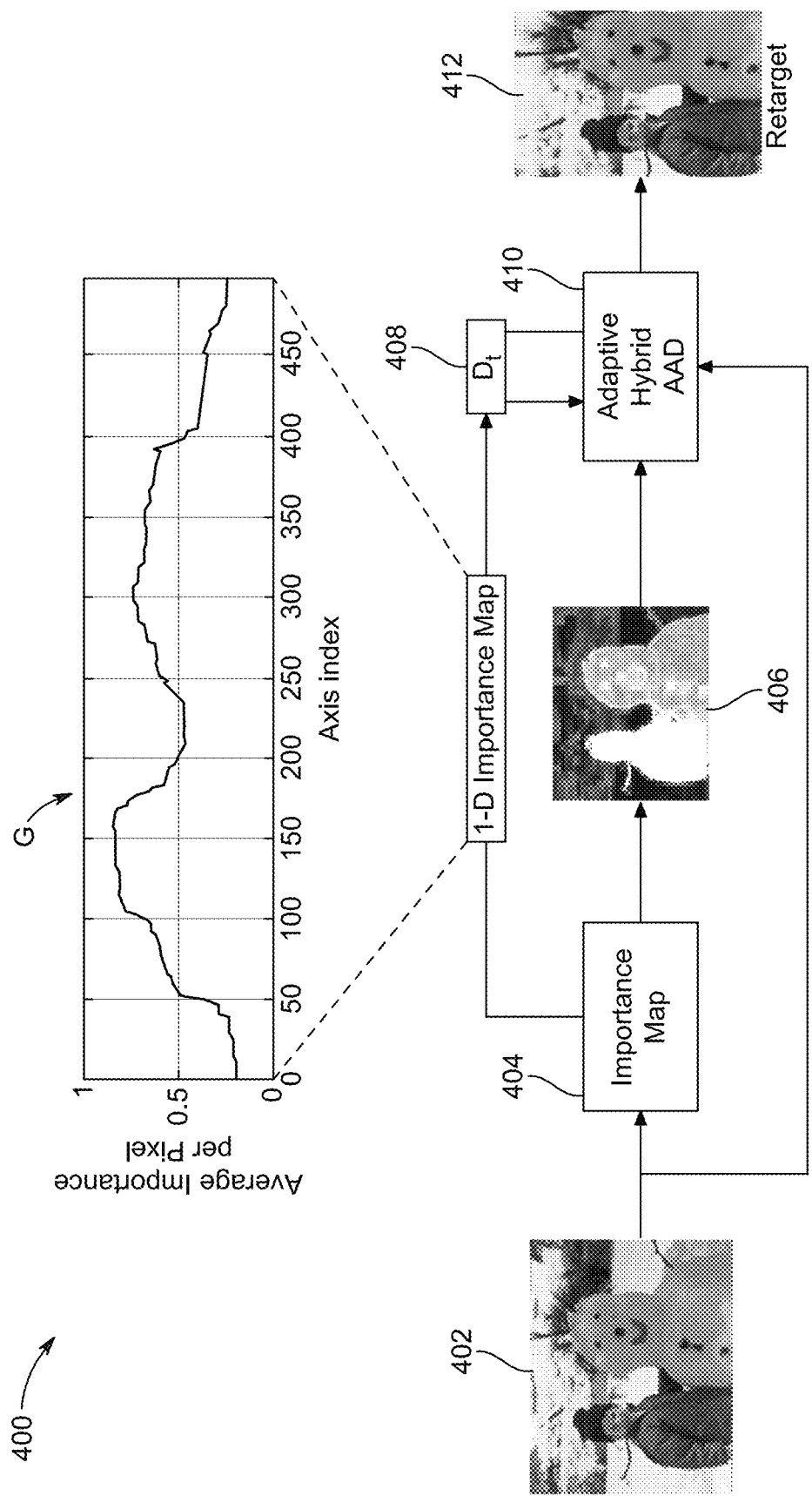
FIG. 4 illustrates an exemplary flow chart of the image retargeting system, according to aspects of the present disclosure.
Figure 5:
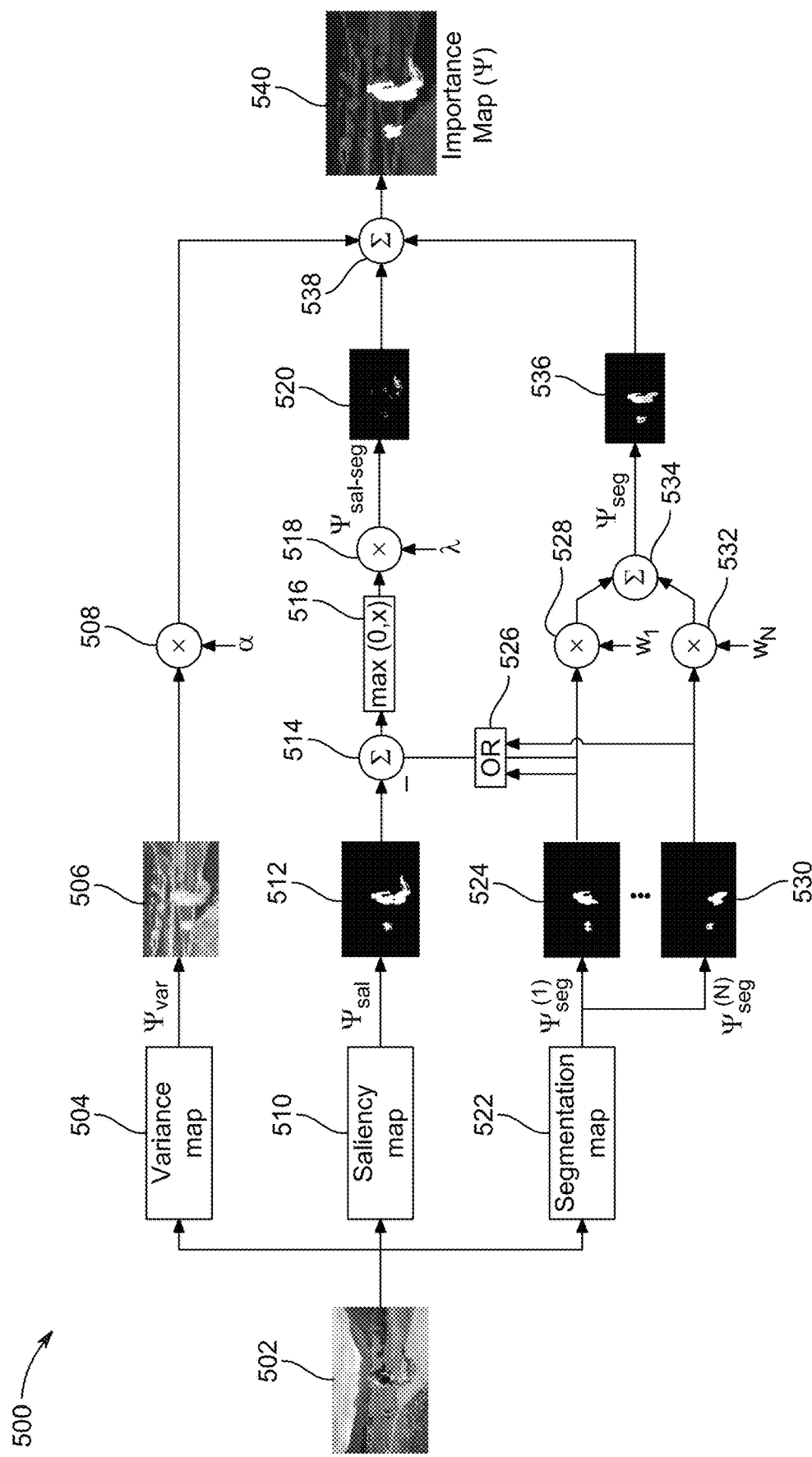
FIG. 5 illustrates a method of generation of an importance map, according to aspects of the present disclosure.

FIG. 4 illustrates an exemplary flow chart 400 of the image retargeting system 200, according to aspects of the present disclosure. In an operative aspect, the image retargeting system 200 is configured to operate in two sections: generating the importance map 404 (as shown in FIG. 5), and employing an adaptive hybrid AAD 410.

In a first step, the image retargeting system 200 is configured to receive the input image 402 from the image capture device. In an aspect, the input image 402 is a photo, an image, a video, a video frame, a sequence of video frames, or an image information.

In a second step, the image retargeting system 200 generates the importance map 404 corresponding to the input image 402. In an aspect, the importance map 404 is based on the segmentation map, the saliency map, and the variance map.

In a third step, the image retargeting system 200 generates a plurality of cells 406 corresponding to the input image 402. In an aspect, a distortion measure ($D_m$) is also calculated for each of the plurality of cells, according to the input image.

In a fourth step, a distortion threshold function is calculated from the importance map. The distortion threshold function is used to calculate the distortion threshold ($D_t$). In an aspect, 1-dimensional importance vector is employed for calculating the distortion threshold ($D_t$). Each element of the 1-dimensional importance vector is an average of importance values in a row or a column of the importance map (as shown by "G" in FIG. 4). The distortion threshold ($D_t$) and distortion measure ($D_m$) is applied to generate a modification to be applied to each of a plurality of cells 406.

In an operative aspect, the adaptive hybrid AAD 410 is employed on the generated importance map 404 and the generated distortion threshold function ($D_t$). In an aspect, the adaptive hybrid AAD represents a modification to be applied to each of the plurality of cells based on the $D_t$ and D. The adaptive hybrid AAD 410 is configured to apply the modification to each of the plurality of cells and generate a modified plurality of cells. The modified plurality of cells generates a retargeted image 412.

The adaptive hybrid AAD 410 is configured to output the retargeted image 412 on the user computing device. In an example, at least one dimension of the retargeted image is different than the corresponding dimension of the input image.

FIG. 5 illustrates a method 500 of generation of the importance map 540, according to aspects of the present disclosure.

In the present disclosure, the importance map 540 (fused map) is a fusion of three components: the segmentation map 522, the saliency map 510, and the variance map 504. The segmentation map 522 is the output of a semantic segmentation network that is trained to detect certain objects in the input image 502. The semantic segmentation network results in a binary map for each of the objects on which the semantic segmentation network was trained. In an example, in the present disclosure, (N) mutually exclusive classes were defined that contain multiple objects (similar to the input image). In an aspect, a first binary map 524 is assigned with a weight $w_1$, as shown by 528. A second binary map 530 is assigned with a weight $w_2$, as shown by 532. The first binary map 524 and the second binary map 530 are combined (as shown by 534) to generate a class map 536. The combinations of all binary maps (524, 530) of the objects in a given class generates the class map given as:

$$\Psi_{seg}^{(i)}, i \in [1, N].$$

Each class is assigned with a weight reflecting its importance, i.e., $w_1$, $i \in [1, N]$. The larger the weight assigned to the class, the higher the importance of that class. These weights ensure that a more informed decision is made on which objects to preserve during the image retargeting. The final segmentation map 522 is obtained by summing all weighted binary maps for the different classes, i.e., $\Psi_{seg} = \Sigma_i^N \Psi_{seg}^{(i)}$. In an example, the classes may be chosen by the user depending on various applications (such as according to the user computing device, a task for which the retargeted image is required).

The second component of the importance map 540 is the saliency map 510. The objective of the saliency map 510 is to complement the importance map 540 in areas where the segmentation map 522 does not offer any information. The saliency map 510 is generated according to the second function $\Psi_{sal}$ based on the input image. In an example, saliency map 510 is configured to segment the input image 502 into a plurality of cells (512). The $\Psi_{sal}$ contains values in [0, 1] indicating the saliency of each pixel. For example, the saliency map 510 is needed for objects on which the semantic segmentation network was not trained. In addition, the saliency map $\Psi_{sal}$ also helps in preserving certain salient parts of the image such as background details. The map $\Psi_{sal}$ is subtracted (as shown by 526) with either the first binary map 524 or the second binary map 530. Thus, a map $\Psi_{sal\text{-}seg}$ (514) is defined that includes elements that are present in $\Psi_{sal}$ but not detected by $\Psi_{seg}$ as $\Psi_{sal\text{-}seg} = \max(\Psi_{sal} - \Psi_{seg}, 0)$ (as shown by 516). The $\Psi_{sal\text{-}seg}$ is multiplied by the hyperparameter $\lambda$ (as shown by 518). The $\Psi_{seg}$ is binary, whereas $\Psi_{sal}$ contains values in [0, 1] indicating the saliency of each pixel. Thus, the expression $\Psi_{sal} - \Psi_{seg}$ will be positive only in cases where a pixel is highlighted in $\Psi_{sal}$ but not in $\Psi_{seg}$. Otherwise, the expression may be negative which is then set to 0 by max(0, x). In an example, a class map 520 is generated by the second function $\Psi_{sal}$.

The third component is the variance map 504 which is computed as the blockwise local variance of the input image 502. The variance map 504 is generated according to a third function $\Psi_{var}$ based on the input image. The variance map 504 gives an importance map information (as shown by 506) about the general structure of the image. The third function is multiplied by the hyperparameter $\alpha$ (as shown by 508). The variance map 504 captures components that are not detected by the other two maps, and yet applying too much distortion on the segmentation map 522, the saliency map 510 will result in unnatural images. Examples of such components include lines and geometric shapes. Finally, the importance map 540 is then computed as a linear combination of three maps (as shown by 538):

$$\Psi_{imp} = \Psi_{seg} + \lambda \Psi_{sal\text{-}seg} + \alpha \Psi_{var}. \tag{2}$$

where $\Psi_{seg}$ is the segmentation map, $\Psi_{sal\text{-}seg}$ is the map that contains elements that are present in the saliency map but were not detected by any of the segmentation maps, $\Psi_{var}$ is the variance map, and $\alpha$, $\lambda$, are hyperparameters that control the influence of their respective maps.

In the present disclosure, a Mask Region-Based Convolutional Neural Networks (R-CNN) is employed to train (pre-train) Microsoft (MS) COCO dataset to generate the segmentation map. The Mask R-CNN is used for object detection, such as on standard benchmark datasets and in computer vision competitions. For example, the MS COCO dataset includes eighty (80) different objects (categories). In the present disclosure, twenty nine (29) categories were chosen out of the 80 different objects. The chosen 29 categories were grouped into four (4) main classes with different weights: person ($w_1$=0.9), animal ($w_2$=0.9), vehicle ($w_3$=0.7), and furniture ($w_4$=0.6). The weights given for the different classes were based on how humans observe the stretching of different objects. For the saliency map, the present disclosure employed a pre-trained saliency detection model. For example, $\lambda=\alpha=0.5$ is chosen in equation (2).

During the experimentation, the performance of the method 300/system 200 was evaluated by comparing the present method/system with a non-uniform scaling (SCL) technique, a seam carving (SC) technique, a cycle-IR (CIR) technique, and a self-play reinforcement learning (RL) technique. During the experimentation, the evaluation was conducted on RetargetMe dataset which includes a total of eighty (80) color images.

Figure 6C:
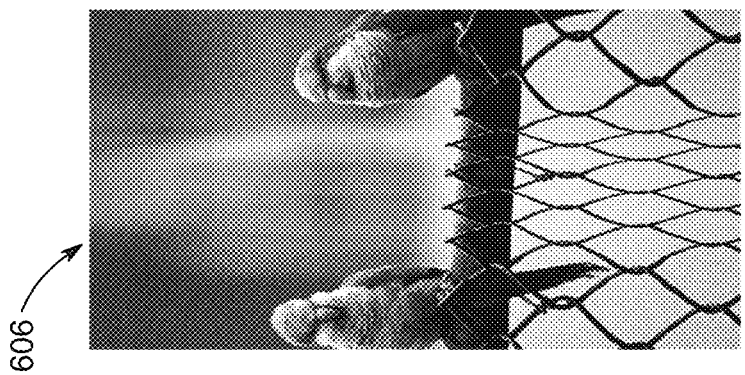
FIG. 6C illustrates an image retargeting obtained using the adaptive hyperparameters, according to aspects of the present disclosure.
Figure 6B:
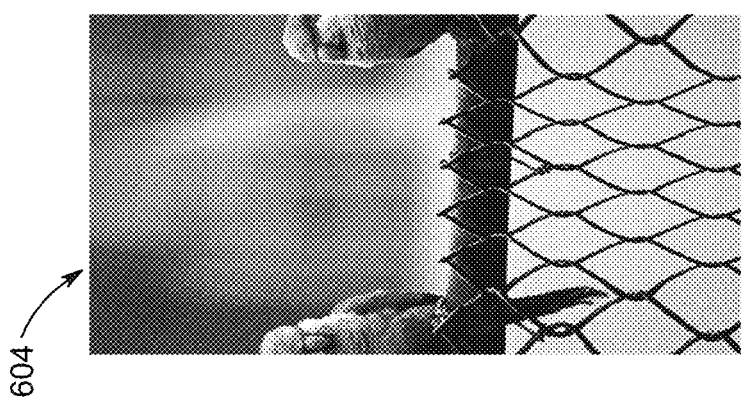
FIG. 6B illustrates an image retargeting attained using the fixed hyperparameters, according to aspects of the present disclosure.
Figure 6A:
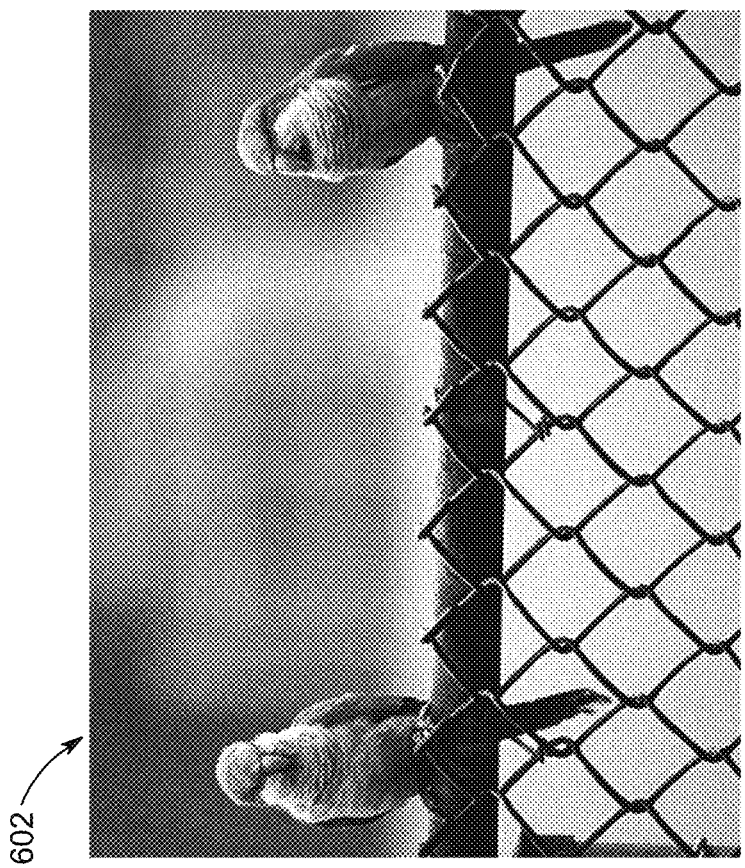
FIG. 6A illustrates an original image showing advantages of using adaptive hyperparameters in comparison with using fixed hyperparameters, according to aspects of the present disclosure.

FIG. 6A illustrates an original image 602 showing the benefits of using the adaptive hyperparameters in comparison with using the fixed hyperparameters.

FIG. 6B illustrates an image retargeting 604 attained using the fixed hyperparameters. As shown in FIG. 6B, the fixed hyperparameters is not adapting to the image content, resulting in undesirable cropping.

FIG. 6C illustrates an image retargeting 606 obtained using the adaptive hyperparameters.

FIG. 7A-FIG. 7D illustrate a plurality of source images and their corresponding retargeted images obtained using different retargeting techniques, according to aspects of the present disclosure.

FIG. 7A is a representation 700 of a source image 702 and corresponding retargeted images obtained using different retargeting techniques. The retargeted image 703 is obtained from the SCL technique (conventional). The retargeted image 704 is obtained from the SC technique (conventional). The retargeted image 705 is obtained from the Cycle-IR technique (conventional). The retargeted image 706 is obtained from the RL technique. The retargeted image 707 is obtained from the present method 300.

FIG. 7B is another representation 710 of a source image 712 and corresponding retargeted images obtained using different retargeting techniques. The retargeted image 713 is obtained from the SCL technique (conventional). The retargeted image 714 is obtained from the SC technique (conventional). The retargeted image 715 is obtained from the Cycle-IR technique (conventional). The retargeted image 716 is obtained from the RL technique (conventional).

Figure 7C:
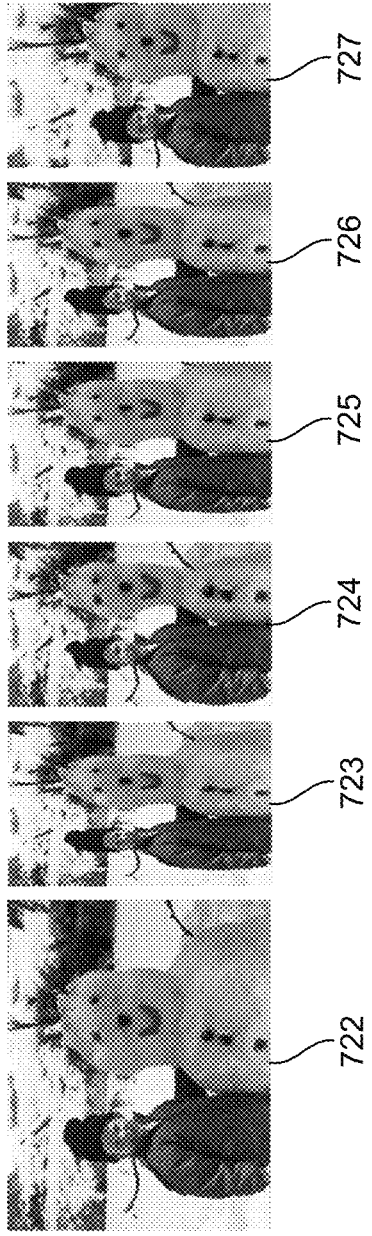
FIG. 7C is another representation of a source image and corresponding retargeted images obtained using different retargeting techniques, according to aspects of the present disclosure.

The retargeted image 717 is obtained from the present method 300. FIG. 7C is a representation 720 of a source image 722 and corresponding retargeted images obtained using different retargeting techniques. The retargeted image 723 is obtained from the SCL technique (conventional). The retargeted image 724 is obtained from the SC technique (conventional). The retargeted image 725 is obtained from the Cycle-IR technique (conventional). The retargeted image 726 is obtained from the RL technique (conventional). The retargeted image 727 is obtained from the present method 300.

Figure 7D:
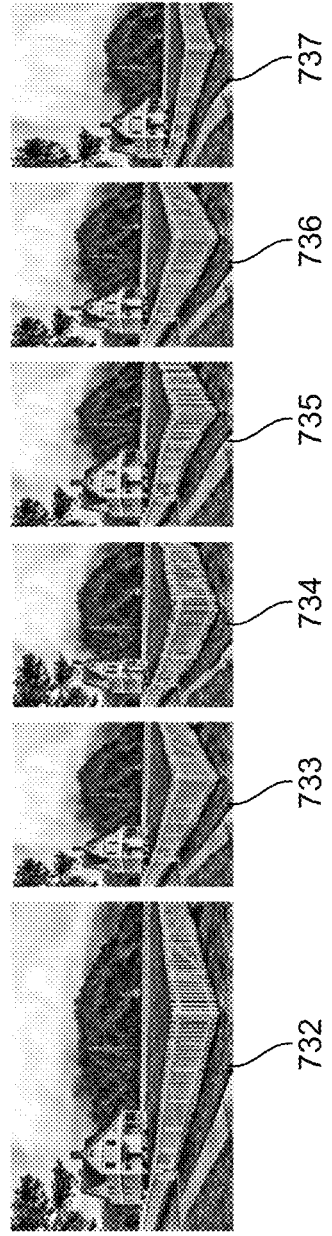
FIG. 7D is another representation of a source image and corresponding retargeted images obtained using different retargeting techniques, according to aspects of the present disclosure.

FIG. 7D is another representation 730 of a source image 732 and corresponding retargeted images obtained using different retargeting techniques. The retargeted image 733 is obtained from the SCL technique (conventional). The retargeted image 734 is obtained from the SC technique (conventional). The retargeted image 735 is obtained from the Cycle-IR technique (conventional). The retargeted image 736 is obtained from the RL technique (conventional). The retargeted image 737 is obtained from the present method 300.

From FIG. 7A-FIG. 7D, it is evident that the present method 300 performs better than other conventional retargeting techniques, for example, on images that include objects of the classes that was chosen in the segmentation map. For example, the cat image, in FIG. 7B, shows the effectiveness of the segmentation map and the class weights in minimizing the distortion between different classes in retargeting. For the case where the segmentation map does not contribute to the importance map, as in the house image in FIG. 7D, it is evident that all retargeting techniques did relatively the same except for SC technique (conventional) as shown by 734. However, the effect of the variance map, in the present method 300, on the quality of the geometric shapes, i.e., the fence and the house, as shown in FIG. 7D.

During an evaluation of the present method 300, an image retargeting quality assessment (IRQA) was used. The IRQA is configured to assess the quality of the retargeted images. An Aspect Ratio Similarity (ARS) metric was employed for measuring uses of the importance map to detect the geometric-based quality degradation of the retargeted image. For example, the higher scores of the ARS metric indicate better retargeting, specifically, better preservation of features or parts that provide rich information of the image, in the image. Since the technique requires the importance map as a reference, the ARS scores were calculated using both the fused maps of the present system, and the maps used in a conventional method, in which the maps were obtained by detecting saliency in a compressed domain. In the present method 300, the average ARS scores for the 80 RetargetMe images was taken, and the results are summarized in Table 1. The table 1 shows that for the fused maps, the present method 300 scored the highest average ARS score out of all the conventional techniques.

TABLE 1

Average ARS Scores

| Technique | Fusion maps of the present disclosure | Maps of the conventional method |
|---|---|---|
| SCL | 0.8885 | 0.8915 |
| SC (S. Avidan et al.) | 0.9000 | 0.8843 |
| RL (N. Kajiura et al.) | 0.9031 | 0.9054 |
| CIR (W. Tan et al.) | 0.8292 | 0.8110 |
| The Present system 200 | 0.9323 | 0.8921 |

In image retargeting objective evaluation, each metric has a bias toward certain objectives that do not necessarily match how the human eye observes the images. For example, ARS metric needs a reference importance map to evaluate the preservation of the where features/parts that provide rich information of the image, in the image. The present method 300 scored the highest when using the importance maps (fused maps) as the reference since the objective of the present method 300 is to preserve the same features/parts that provide rich information, of the image. Due to lack of objective measures in the field of image retargeting, the present system/method adapted the RetargetMe procedure for the image retargeting quality assessment. In an example, the image retargeting quality assessment was conducted for various retargeting techniques and the present system, and a vote-based user study was conducted. In the user study, a total of 203 subjects were asked to compare our method with other retargeting techniques.

For each subject, ten (10) out of the 80 images in the dataset were randomly selected for the comparison. During the user study, the original image with two retargeted images was showed. In every question, the subjects compared the present method 300 with a randomly selected (uniform) one out of the four conventional methods above and the users were asked to choose the image that they like better. The results are summarized in Table 2 which shows the average vote rates for a total of 2,030 pairwise comparisons. The present method 300 obtained higher average votes compared to the other conventional image retargeting methods indicating that the present method 300 was subjectively more appealing to the users.

TABLE 2

Result of user study

| Technique | Vote Rate (%) |
| --- | --- |
| SCL/the present system | 29.2/70.8 |
| SC (S. Avidan et al.)/ the present system | 38.4/61.6 |
| RL (N. Kajiura et al.)/ the present system | 36.1/63.9 |
| CIR (W. Tan et al.)/ the present system | 33.2/66.8 |

The present disclosure describes a content-aware adaptive image retargeting method. The described method 300 utilizes an improved importance map (fused map) that considers the importance level of the different objects in the image in addition to the overall structure, to aid the retargeting method. The described method 300 is configured to adapt the hyperparameters to the content of the image and the importance map. The described method 300 shows improved results compared to the state-of-the-art retargeting based on the user study on the RetargetMe dataset. The present disclosure is employable in modern digital communication that includes many applications that generate data in the form of images and videos. The present disclosure is applicable to a wide range of applications that require real-time operation, including satellite image processing, medical image processing, microscopy image processing, the multimedia industry, video enhancement, and astrological studies. The present disclosure is configured to be employed in a system related to surveillance to detect, identify, and perform facial recognition on low-resolution images obtained from security cameras to enhance the accuracy of the system.

As the content-aware adaptive image retargeting method is capable of reducing server costs, the present system is deployable in various applications related to media where files can be sent at a lower resolution and upscaled on the other end. Aside from this application, the present disclosure could be used in object detection, the automotive industry, real-time processing, scanning, surveillance, military, and forensics.

An embodiment is illustrated with respect to the hardware description of the computing environment of FIG. 2 according to exemplary embodiments described with reference to FIG. 8.

Figure 8:
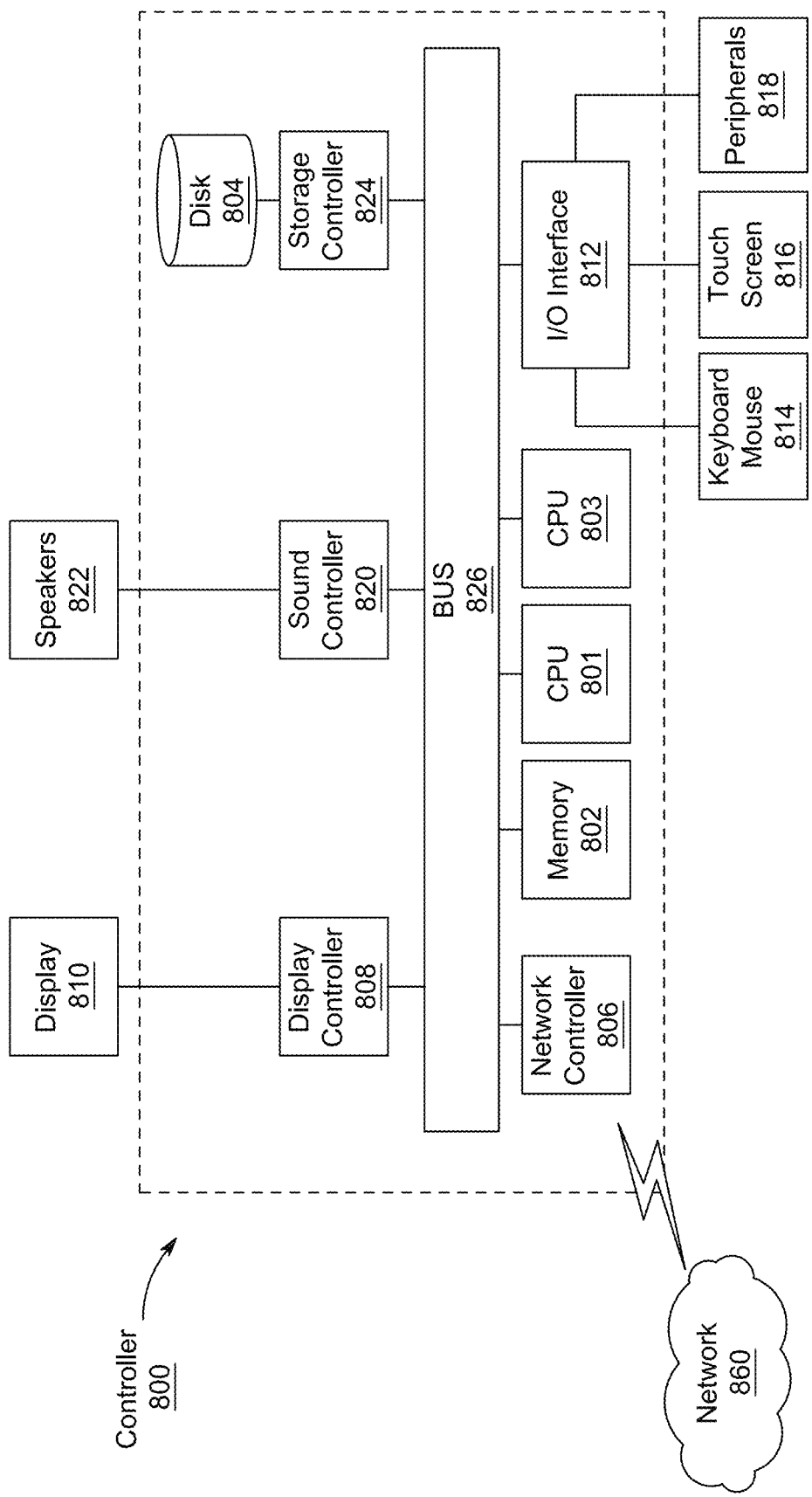
FIG. 8 is an illustration of a non-limiting example of details of computing hardware used in the computing system, according to aspects of the present disclosure.

In FIG. 8, a controller 800 is described as representative of the image retargeting system 200 of FIG. 2 in which processing circuitry 206, and the image capture device 208 is a computing device which includes a CPU 801 which performs the processes described above/below. FIG. 8 is an illustration of a non-limiting example of details of computing hardware used in the computing system, according to exemplary aspects of the present disclosure. In FIG. 8, a controller 800 is described which is a computing device and includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of the ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with the display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard. For simplicity, the present disclosure assumes the touch screen panel 816 is a capacitance-type touch panel technology. However, it should be appreciated that aspects of the present disclosure may easily be applied to other touch panel types (e.g., resistance-type touch panels) with alternate structures. In certain aspects of the present disclosure, the touch screen panel 816 may include transparent electrode touch sensors arranged in the X-Y direction on the surface of transparent sensor glass.

The touch screen panel 816 and the display 810 may be surrounded by a protective casing, which may also enclose the other elements included in the computing device. In an embodiment, a position of the user's fingers on the protective casing (but not directly on the surface of the display 810) may be detected by the touch screen panel 816 sensors. Accordingly, the display controller 808 may perform display control processing described herein based on the detected position of the user's fingers gripping the casing. For example, an element in an interface may be moved to a new location within the interface (e.g., closer to one or more of the fingers) based on the detected finger position.

A sound controller 820 is also provided in the computing device such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein.

Figure 9:
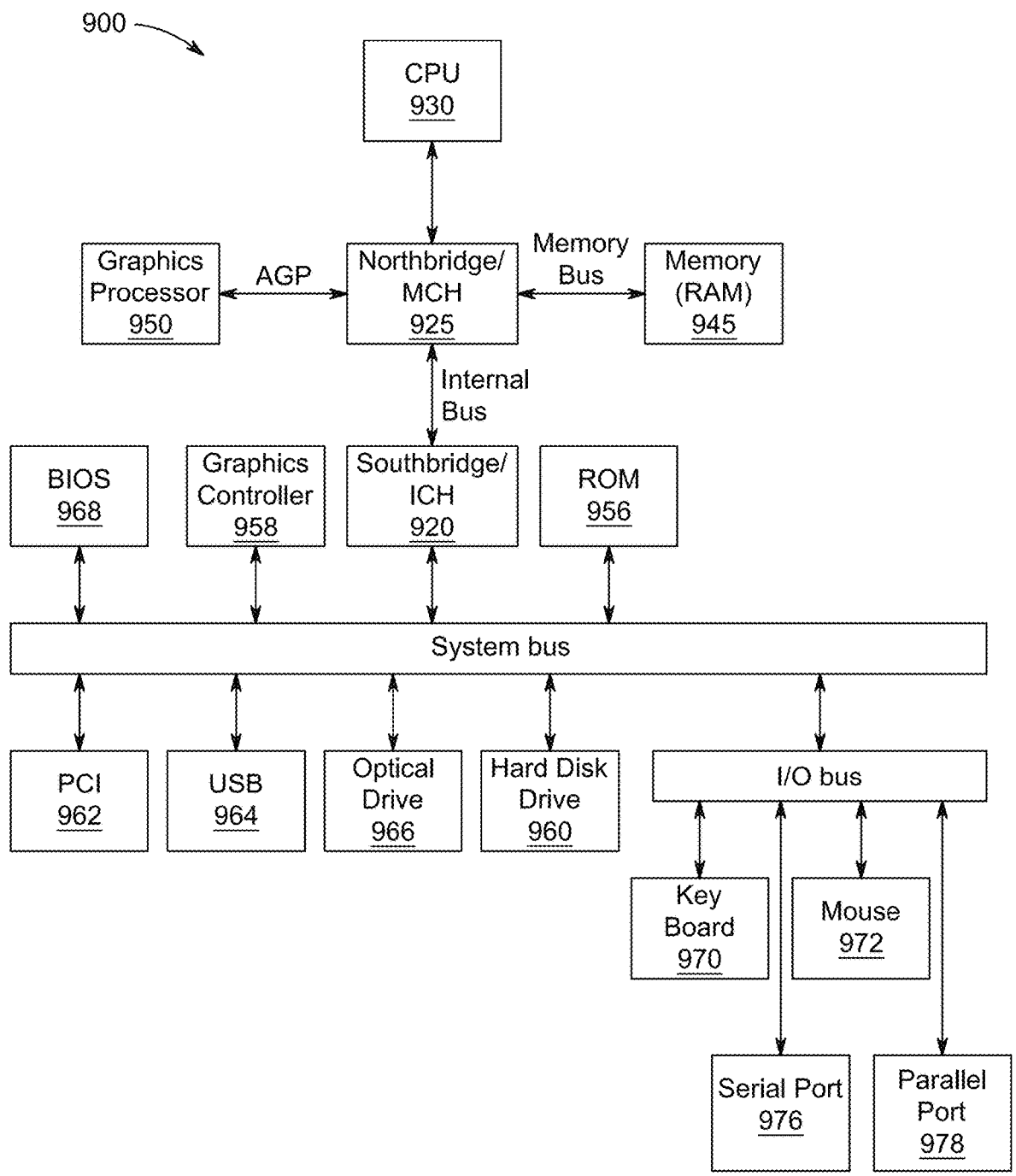
FIG. 9 is an exemplary schematic diagram of a data processing system used within the computing system, according to aspects of the present disclosure.

Moreover, circuitry configured to perform features described herein may be implemented in multiple circuit units (e.g., chips), or the features may be combined in circuitry on a single chipset, as shown on FIG. 9.

FIG. 9 shows a schematic diagram of a data processing system 900 used within the computing system, according to exemplary aspects of the present disclosure. The data processing system 900 is an example of a computer in which code or instructions implementing the processes of the illustrative aspects of the present disclosure may be located.

In FIG. 9, data processing system 980 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
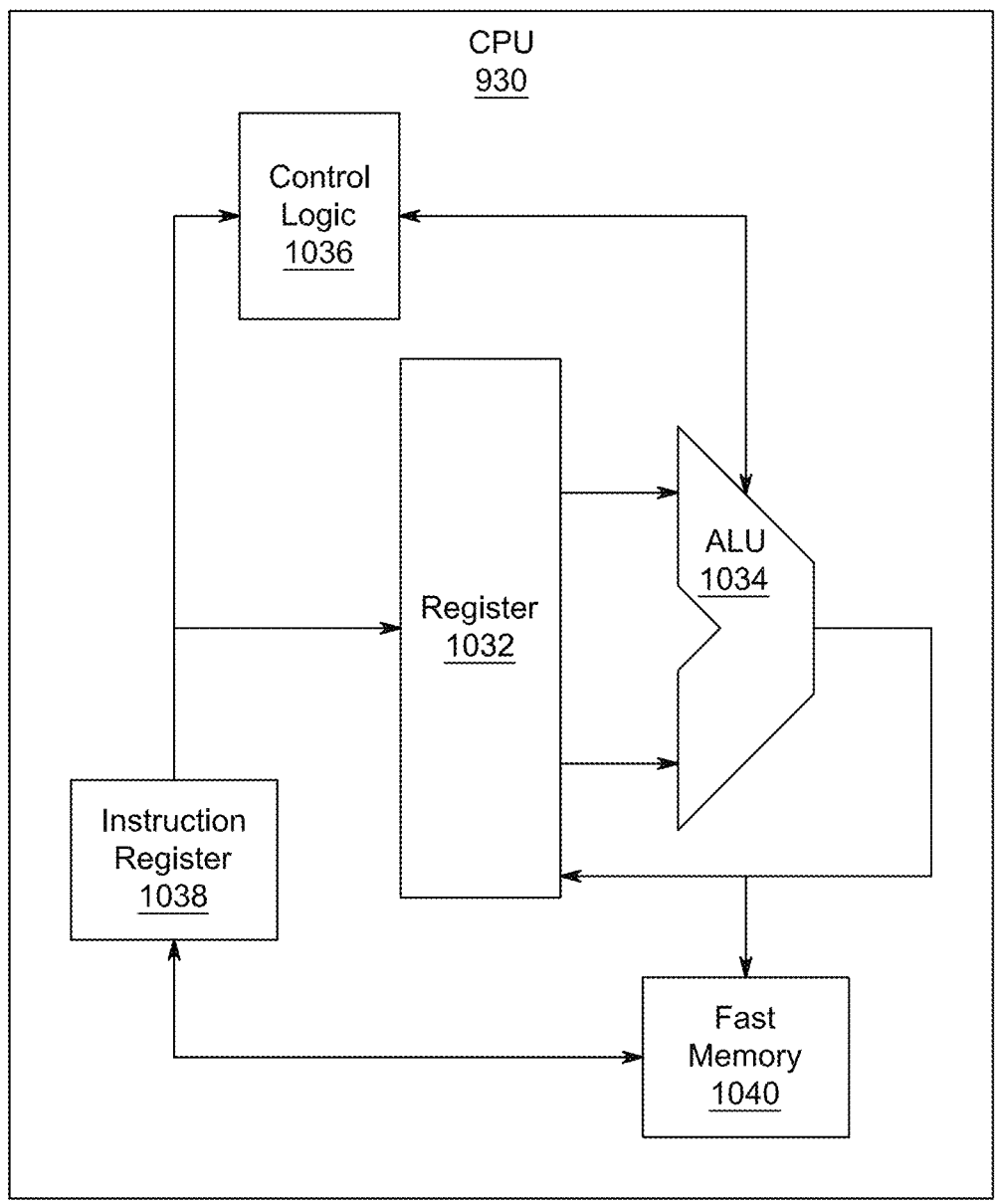
FIG. 10 is an exemplary schematic diagram of a processor used with the computing system, according to aspects of the present disclosure.

For example, FIG. 10 shows one aspect of the present disclosure of CPU 930. In one aspect of the present disclosure, the instruction register 1038 retrieves instructions from the fast memory 1040. At least part of these instructions is fetched from the instruction register 1038 by the control logic 1036 and interpreted according to the instruction set architecture of the CPU 930. Part of the instructions can also be directed to the register 1032. In one aspect of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain aspects of the present disclosures, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 980 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 920 through a PCI bus 962.

The PCI devices may include, for example, Ethernet adapters, add-in cards, and PC cards for notebook computers. The Hard disk drive 960 and CD-ROM 956 can use, for example, an integrated drive electronics (IDE) or serial advanced technology attachment (SATA) interface. In one aspect of the present disclosure the I/O bus can include a super I/O (SIO) device.

Further, the hard disk drive (HDD) 960 and optical drive 966 can also be coupled to the SB/ICH 920 through a system bus. In one aspects of the present disclosure, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
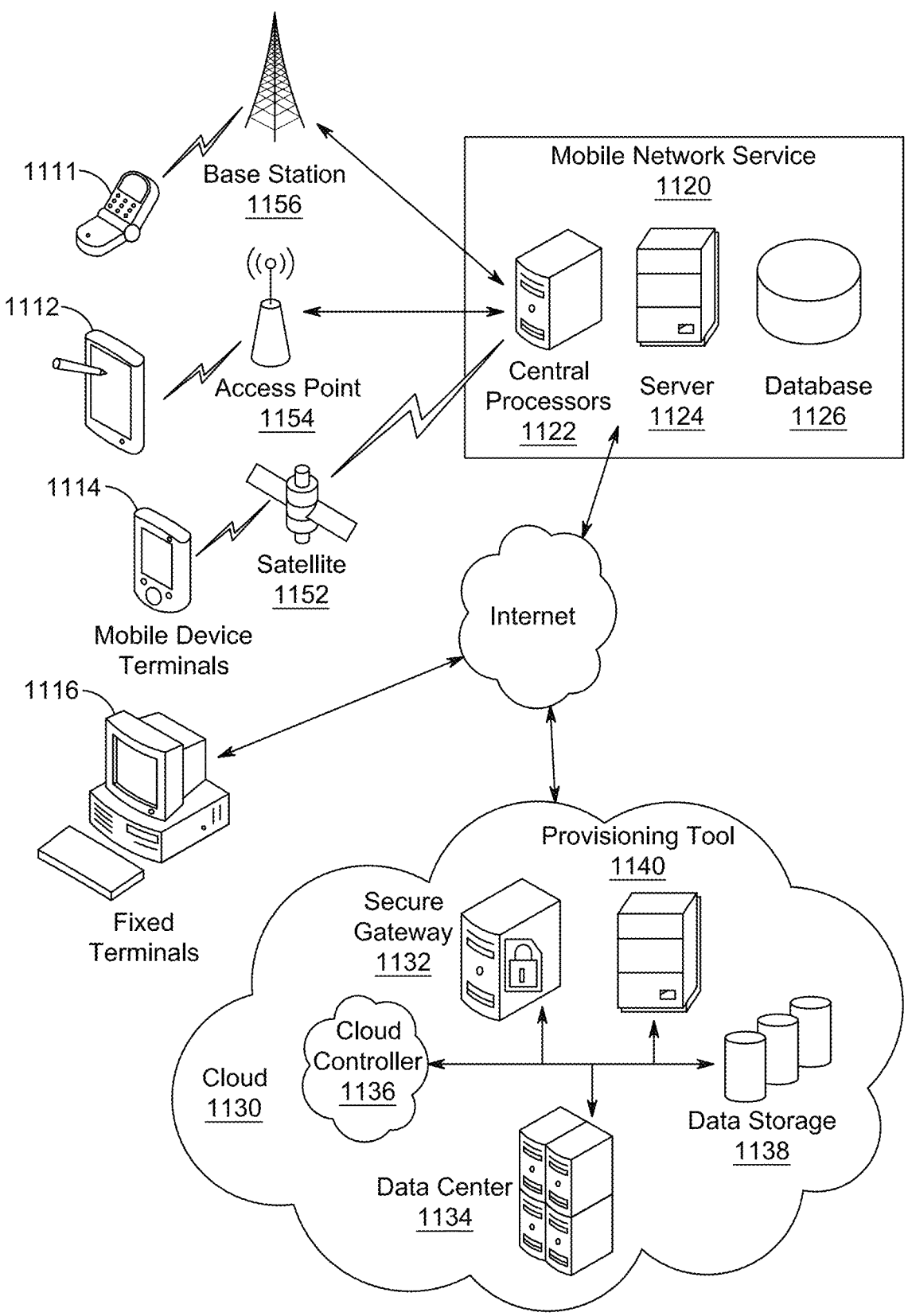
FIG. 11 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). More specifically, FIG. 11 illustrates client devices including smart phone 1111, tablet 1112, mobile device terminal 1114 and fixed terminals 1116. These client devices may be commutatively coupled with a mobile network service 1120 via base station 1156, access point 1154, satellite 1152 or via an internet connection. Mobile network service 1120 may comprise central processors 1122, server 1124 and database 1126. Fixed terminals 1116 and mobile network service 1120 may be commutatively coupled via an internet connection to functions in cloud 1130 that may comprise security gateway 1132, data center 1134, cloud controller 1136, data storage 1138 and provisioning tool 1140. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Numerous modifications and variations of the present disclosure are possible in light of the above teachings. It is therefore to be understood that within the scope of the appended claims, the invention may be practiced otherwise than as specifically described herein.

The invention claimed is:

1. A method of image retargeting, comprising:
    segmenting, via a processing circuitry, an input image into a plurality of cells;
    detecting, via the processing circuitry, elements in the input image via a deep learning-based semantic segmentation network;
    generating, via the processing circuitry, a segmentation map according to a first function $\Psi_{seg}$ based on the input image, wherein the segmentation map includes the elements in the input image detected by the deep learning-based semantic segmentation network;
    generating, via the processing circuitry, a saliency map according to a second function $\Psi_{sal}$ based on the input image, wherein the second function is multiplied by a hyperparameter $\lambda$, the hyperparameter $\lambda$ being assigned a weight;
    generating, via the processing circuitry, a variance map according to a third function $\Psi_a$ based on the input image, wherein the third function is multiplied by a hyperparameter $\alpha$, the hyperparameter $\alpha$ being assigned a weight;
    constructing, via the processing circuitry, an importance map according to a fourth function $\Psi_{imp}$, wherein the importance map is based on the segmentation map, the saliency map, and the variance map;
    inputting the importance map into a distortion threshold function, wherein the distortion threshold function calculates a distortion threshold ($D_t$);
    calculating a distortion measure ($D_m$) for each of the plurality of cells, according to the input image;
    determining, according to $D_t$ and $D_m$, a modification to be applied to each of the plurality of cells;
    applying the modification to each of the plurality of cells, wherein the modification generates a modified plurality of cells, the modified plurality of cells comprising a retargeted image; and
    outputting the retargeted image, wherein at least one dimension of the retargeted image is different than a corresponding dimension of the input image.

2. The method of claim 1, further comprising calculating $D_m$ for a selected cell of the plurality of cells, wherein $$D_m = \frac{1}{A}\sum_{i=1}^{N}\left[\frac{\max(x'_i, y'_i)}{\min(x'_i, y'_i)} - 1\right] \cdot x_i \cdot y_i \cdot (\Omega_i + \Omega_0);$$

wherein A is an area of the retargeted image,
wherein N is a number of cells equal to the plurality of cells,
wherein $x_i$ and $y_i$ are a height and a width, respectively, of the selected cell of the plurality of cells,
wherein $x_i'$ and $y_i'$ are a normalized height and a normalized width of the selected cell of the plurality of cells,
wherein $\Omega_i$ is an average importance, the average importance being determined by the importance map, of pixels in the selected cell of the plurality of cells
wherein $\Omega_0$ is a variance of the selected cell of the plurality of cells;
comparing $D_m$ to $D_t$; and
warping the selected cell of the plurality of cells if $D_m$ is less than $D_t$.

3. The method of claim 2, further comprising cropping the selected cell of the plurality of cells if $D_m$ is greater than $D_t$.

4. The method of claim 2, wherein $\Omega_0$ is based on a variance value of the variance map, $\Omega_0$ being normalized such that $\Omega_0 \in [0,1]$.

5. The method of claim 1, wherein the segmentation map is a weighted combination of class maps,
    wherein each class map is a combination of outputs of the deep learning-based semantic segmentation network,
    wherein each output of the deep learning-based semantic segmentation network is a binary map of detected elements in an image, wherein each class map corresponds to a class of elements, and wherein each class of elements is mutually exclusive.

6. The method of claim 5, further comprising choosing the class of elements, wherein the class of elements correspond to at least one detected element in the input image,
    the at least one detected element in the input image corresponding to parts of the input image most noticeable to human perception.

7. The method of claim 1, wherein the importance map is non-binary.

8. The method of claim 1, wherein the fourth function is:

$$\Psi_{imp} = \Psi_{seg} + \lambda\Psi_{sal-seg} + \alpha\Psi_{var},$$

wherein $\Psi_{sal-seg}$ is a map that contains a class of elements that are present in the saliency map but are not included in the segmentation map, wherein the hyperparameter $\lambda$ of $\Psi_{sal-seg}$ and the hyperparameter $\alpha$ of $\Psi_{var}$ denote the assigned weight of the respective function on the fourth function.

9. The method of claim 1, wherein $D_t$ is set adaptively according to $$D_t = \frac{1}{\beta} \sum_{i=1}^{\Delta L} \frac{2(L-i)}{L(L-1)} K_i,$$

wherein $\beta$ is an average importance value of the importance map, wherein $\Delta L$ is a difference between a dimension of the image and a target dimension of the retargeted image change in a dimension of the input image, wherein L is the dimension of the input image, wherein K is constructed using a 1-dimensional importance vector, wherein each element of the 1-dimensional importance vector is an average of importance values in a row or a column of the importance map, wherein K is a vector containing each element of the 1-D importance vector in ascending order.

10. The method of claim 1, further comprising warping each cell of the plurality of cells to alter a height of each of the plurality of cells and alter a length of each of the plurality of cells, the warping of each of the plurality of cells being based on the importance map.

11. The method of claim 10, further comprising obtaining an importance of each of the plurality of cells from the importance map, the warping of each of the plurality of cells being achieved by inputting the importance of each of the plurality of cells into a quadratic program, wherein the quadratic program calculates a new height and a new length of each of the plurality of cells.

12. A non-transitory computer readable medium having stored thereon a program that when executed by a computing device causes the computer to implement a method for image retargeting, the method comprising:

segmenting, via processing circuitry, an input image into a plurality of cells, detecting, via the processing circuitry, elements in the input image by a deep learning-based semantic segmentation network, generating, via the processing circuitry, a segmentation map according to a first function $\Psi_{seg}$ based on the input image, wherein the segmentation map includes the elements in the input image detected by the semantic segmentation network;

generating, via the processing circuitry, a saliency map according to a second function $\Psi_{sal}$ based on the input image, wherein the second function is multiplied by a hyperparameter $\lambda$, the hyperparameter $\lambda$ being assigned a weight;

generating, via the processing circuitry, a variance map according to a third function $\Psi_{var}$ based on the input image, wherein the third function is multiplied by a hyperparameter $\alpha$, the hyperparameter $\alpha$ being assigned a weight;

constructing, via the processing circuitry, an importance map according to a fourth function $\Psi_{imp}$, wherein the importance map is based on the segmentation map, the saliency map, and the variance map;

inputting the importance map into a distortion threshold function, wherein the distortion threshold function calculates a distortion threshold ($D_t$);

calculating a distortion measure ($D_m$) for each of the plurality of cells, according to the input image;

determining, according to $D_t$ and $D_m$, a modification to be applied to each of the plurality of cells;

applying the modification to each of the plurality of cells, wherein the modification generates a modified plurality of cells, the modified plurality of cells comprising a retargeted image; and outputting the retargeted image, wherein at least one dimension of the retargeted image is different than a corresponding dimension of the input image.

13. The non-transitory computer readable medium of claim 12, further comprising calculating, with the processing circuitry, $D_m$ for a selected cell of the plurality of cells, wherein $$D_m = \frac{1}{A} \sum_{i=1}^{N} \left[ \frac{\max(x_i', y_i')}{\min(x_i', y_i')} - 1 \right] \cdot x_i \cdot y_i \cdot (\Omega_i + \Omega_0);$$

wherein A is an area of the retargeted image, wherein N is a number of cells equal to the plurality of cells, wherein $x_i$ and $y_i$ are a height and a width, respectively, of the selected cell of the plurality of cells, wherein $x_i'$ and $y_i'$ are a normalized height and a normalized width of the selected cell of the plurality of cells, wherein $\Omega_i$ is an average importance, the average importance being determined by the importance map, of pixels in the selected cell of the plurality of cells wherein $\Omega_0$ is a variance of the selected cell of the plurality of cells;

comparing $D_m$ to $D_t$; and warping the selected cell of the plurality of cells if $D_m$ is less than $D_t$.

14. The non-transitory computer readable medium of claim 13, further comprising, with the processing circuitry, cropping the selected cell of the plurality of cells if $D_m$ is greater than $D_t$.

15. The non-transitory computer readable medium of claim 13, wherein the processing circuitry determines $\Omega_0$ based on a variance value of the variance map, $\Omega_0$ being normalized such that $\Omega_0 \in [0,1]$.

16. The non-transitory computer readable medium of claim 12, wherein the fourth function is:

$$\Psi_{imp} = \Psi_{seg} + \lambda \Psi_{sal-seg} + \alpha \Psi_{var},$$

wherein $\Psi_{sal-seg}$ is a map that contains a class of elements that are present in the saliency map but are not included in the segmentation map, wherein the hyperparameter $\lambda$ of $\Psi_{sal-seg}$ and the hyperparameter $\alpha$ of $\Psi_{var}$ denote the assigned weight of the respective function on the fourth function.

17. The non-transitory computer readable medium of claim 12, wherein the processing circuitry sets $D_t$ adaptively according to $$D_t = \frac{1}{\beta}\sum_{i=1}^{\Delta L} \frac{2(L-i)}{L(L-1)}K_i,$$

wherein $\beta$ is an average importance value of the importance map, wherein $\Delta L$ is a difference between a dimension of the image and a target dimension of the retargeted image change in a dimension of the input image, wherein L is the dimension of the input image, wherein K is constructed using a 1-dimensional importance vector, wherein each element of the 1-dimensional importance vector is an average of importance values in a row or a column of the importance map, wherein K is a vector containing each element of the 1-D importance vector in ascending order.

18. An image retargeting system comprising:

a computing device including memory that stores an input image, the input image comprising at least one subject and at least one class, at least one processor that executes instructions stored in memory, wherein execution of the instructions by the at least one processor implements a method of image retargeting, the method comprising:

segmenting the input image into a plurality of cells, detecting elements in the input image by a segmentation network, generating a segmentation map according to a first function $\Psi_{seg}$ based on the input image, wherein the segmentation map includes the elements in the input image detected by a deep learning-based semantic segmentation network;

generating a saliency map according to a second function $\Psi_{sal}$ based on the input image, wherein the second function is multiplied by a hyperparameter $\lambda$, the hyperparameter $\lambda$ being assigned a weight;

generating a variance map according to a third function $\Psi_{var}$ based on the input image, wherein the third function is multiplied by a hyperparameter $\alpha$, the hyperparameter $\alpha$ being assigned a weight;

constructing an importance map according to a fourth function $\Psi_{imp}$, wherein the importance map is based on the segmentation map, the saliency map, and the variance map;

inputting the importance map into a distortion threshold function, wherein the distortion threshold function calculates a distortion threshold ($D_t$);

calculating a distortion measure ($D_m$), according to the input image;

determining, according to $D_t$ and $D_m$, a modification of each of the plurality of cells;

outputting a retargeted image, wherein the dimensions of the retargeted image is different than the input image.

19. The system of claim 18, wherein the variance map is computed by the at least one processor as a blockwise local variant of the input image.

20. The system of claim 18, wherein an image capture device includes a processor with instructions to capture the input image, the processer transferring the input image to the memory of the image retargeting system.

\* \* \* \* \*